US008379747B2

(12) United States Patent
Guthy et al.

(10) Patent No.: US 8,379,747 B2
(45) Date of Patent: Feb. 19, 2013

(54) SPATIAL SUB-CHANNEL SELECTION AND PRE-CODING APPARATUS

(75) Inventors: Christian Guthy, Munich (DE); Wolfgang Utschick, Ingolstadt (DE); Guido Dietl, Munich (DE); Josef Nossek, Iffeldorf (DE); Pedro Tejera, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 913 days.

(21) Appl. No.: 12/454,681

(22) Filed: May 20, 2009

(65) Prior Publication Data

US 2009/0323848 A1 Dec. 31, 2009

Related U.S. Application Data

(60) Provisional application No. 61/130,444, filed on May 29, 2008.

(30) Foreign Application Priority Data

May 20, 2008 (EP) .................................... 08009276

(51) Int. Cl.
*H04B 7/02* (2006.01)

(52) U.S. Cl. ........ 375/267; 375/260; 375/295; 375/299; 375/340; 375/347; 455/101; 455/132; 455/500; 455/562.1; 370/334; 370/464

(58) Field of Classification Search .................. 375/260, 375/267, 299, 295, 340, 347; 455/101, 132, 455/500, 562.1; 370/334, 464
See application file for complete search history.

(56) References Cited

U.S. PATENT DOCUMENTS

2004/0176097 A1 9/2004 Wilson et al.
2007/0064829 A1* 3/2007 Zheng et al. .................. 375/267

2008/0316099 A1* 12/2008 Fujii ............................. 342/373

FOREIGN PATENT DOCUMENTS

EA 1 965 508 A1 9/2008
WO WO-2006048037 A1 5/2006

OTHER PUBLICATIONS

Japanese Office Action for Japanese App. No. 2009-122093 dated Jun. 7, 2011.
Shen, et al., "Low Complexity User Selection Algorithms for Multiuser MIMO Systems with Block Diagonalization," IEEE, pp. 628-632 (2005).
Tejera, et al., "Subchannel Allocation in Multiuser Multiple-Input-Multiple-Output Systems," IEEE Transactions on Information Theory, 52:4721-4733 (2006).
A Near-Optimum Technique Using Linear Precoding for the Mimo Broadcast Channel, Frederico Boccardi and Howard Huang, Bell Labs, ICASSP 2007.

(Continued)

*Primary Examiner* — Leon Flores
(74) *Attorney, Agent, or Firm* — Nutter McClennen & Fish LLP; John J. Penny, Jr.; Christina M. Sperry

(57) ABSTRACT

A spatial sub-channel selection and pre-coding apparatus for being operative in a first communication device, the first communication device being adapted for communicating with a second and a third communication device using MIMO (Multiple-Input-Multiple-Output) radio channels, a first MIMO radio channel extending between the first communication device and the second communication device having at least one spatial sub-channel, a second MIMO radio channel extending between the first communication device and the third communication device having at least one spatial sub-channel, wherein one of the first MIMO radio channel or the second MIMO radio channel has at least two spatial sub-channels.

22 Claims, 11 Drawing Sheets

OTHER PUBLICATIONS

Capacity and Lattice Strategies for Canceling Known Inference, Uri Erez et al., IEEE Transactions on Information Theory, vol. 51 No. 11 Nov. 2005.

Goran Dimic and Nicholas D. Sidiropollos, On Downlink Beamforming With Greedy User Selection: Performance Analysis and a Simple New Algorithm, IEEE Transactions on Signal Processing, vol. 53., No. 10., Oct. 2005.

Joint Transmit and Receive Multi-User MIMO Decomposition Approach for the Downlink of Multi-user MIMO Systems, Ruly Lai-U Choi, et al.; Department of Electrical and Electronic Engineering; Hong Kong University of Science and Technology, Clear Water Bay, Kowloon, Hong Kong 2003.

Low Complexity Space-Time-Frequency Scheduling for MIMO Systems with SDMA , Martin Fuchs et al. IEEE Transactions on Vehicular Technology, vol. 56, No. 5., Sep. 2007.

Low Complexity User Selection Algorithms for Multiuser MIMO Systems With Block Diagonalization, Zukang Shen et al. IEEE Transactions on Signal Processing, vol. 54, No. 9., Sep. 2006.

Multiuser MIMO Channel Measurements and Performance in a Large Office Environment, Gerhard Bauch et al., DoCoMo Euro-Labs, Landsberger Strasse 308-312, D-80687, Munich, Germany, 2007.

On the Achievable Throughput of a Multiantenna Gaussian Broadcast Channel, Guiseppe Caire et al., IEEE Transaction on Information Theory, vol. 49., No. 7 Jul. 2003.

On the Optimality of Multiantenna Broadcast Scheduling Using Zero-Forcing Beamforming, Taesang Yoo and Andrea Goldsmith, Member, IEEE, IEEE Journal on Selected Areas in Communications, vol. 24., No. 3, Mar. 2006.

Sub-channel Allocation in Multi-User Multiple-Input-Multiple-Output Systems, Pedro Tejera, Wolfgange Utschick, Gerhard Bauch and Josef A, Nossek, IEEE Transactions on Information Theory, vol. 52, No. 10 Oct. 2006.

Sum Power Iterative Water-Filling for Multi-Antenna Gaussiam Broadcast Channels, Nihar Jindal et al. IEEE Transactions on Information Theory, vol. 51, No. 4, Apr. 2005.

Sum-Capacity Computation for the Gaussian Vector Broadcast Channel Via Dual Decomposition, Wei Yu, Member, IEEE, IEEE Transactions on Information Theory, vol. 52, No. 2, Feb. 2006.

Sum-Rate Optimal Multi-Antenna Downlink Beamforming Strategy Based on Clique Search, Taesang Yoo and Andrea Goldsmith, Department of Electrical Engineering, Stanford University, Stanford, CA 94305, IEEE GLOBECOM 2005.

User Selection for MIMO Broadcast Channel with Sequential Water-Filling , Jianqi Wang, David J. Love, Michael D. Zoltowski, Forty-Fourth Annual Allerton Conference, Allerton House, UIUC, Illinois, USA Sep. 27-29, 2006.

Writing on Dirty Paper, Max H.M. Costa, IEEE Transactions on Information Theory, vol. IT-29, No. 3, May 1983.

Zero-Forcing Methods for Downlink Spatial Multiplexinh in Multiuser MIMO Channels, Quentin H. Spencer, et al., IEEE Transactions on Signal Processing, vol. 52., No. 2, Feb. 2004.

* cited by examiner

SPATIAL SUB-CHANNEL SELECTION AND PRE-CODING APPARATUS

The present invention is in the field of multiple-input-multiple-output (MIMO=Multiple-Input-Multiple-Output) communications as it is, for example, utilized in mobile communication systems.

In a point to multi-point communication system, as for instance the downlink of a mobile communication system, the transmitter has the important task of assigning resources such as time, frequency and space components to the receivers under its coverage. If the transmitter knows the channel, i.e. the radio channel, of each user, multiple users can be served at the same time and over the same frequency multiplexing them in space. In a multi-point to point communication system, as for example the uplink of a mobile communication system, this task has to be accomplished by the receiver. In the following the downlink direction of transmission will be illuminated, application to the uplink is straightforward. For this purpose multiple antennas at a base station or access point and at a mobile user are employed which leads to the well-known Multiple-Input-Multiple-Output (MIMO) systems. Here, a MIMO system with K users and with $M_{Tx}$ antennas at the transmitter and $M_{Rx,k}$ antennas at the k-th receiver is considered. The k-th user's channel can be described by the matrix $$H_k \in \mathbb{C}^{M_{Rx,k} \times M_{Tx}}$$

Assuming perfect knowledge of these matrices at the transmitter a common optimization problem looked at is the maximization of sum capacity under a total power constraint. The optimum solution to this problem can be found by iterative water-filling, cf.

W. Yu. Sum-Capacity Computation for the Gaussian Vector Broadcast Channel, *IEEE Transactions on Information Theory*, 52:754-759, 2006, and W. Yu, W. Rhee, S. Vishwanath, S. Jafar, and A. Goldsmith, Sum Power Iterative Waterfilling for Multi-antenna Gaussian Broadcast Channels, *IEEE Transactions on Information Theory*, 51:1570-1580, 2005.

It relies on the principle of Dirty Paper Coding (DPC), cf. M. H. M. Costa, Writing on Dirty Paper, *IEEE Transactions on Information Theory*, 29:439-441, May 1983, which states that interference that is known when a certain data stream is encoded can be perfectly canceled and the maximum achievable rate of this stream is the same as if that interference was not present. The practical implementation of nearly optimum DPC however, is very complex.

Conventional concepts may be theoretically optimal, however, they have the drawback that they require high processing efforts which are far above the practically available processing performances. For instance, true optimization or maximization of the sum rate in the downlink, for example by iterative water filling, requires a very high processing performance as these algorithms are very complex. Moreover, these algorithms involve other complex operations as, for example, the nonlinear dirty paper coding (DPC=Dirty Paper Coding) or vector pre-coding.

Although these proposals can yield optimal utilization of the MIMO radio channel, they require the above non-linear coding or pre-coding operations, respectively. The problems involved with these concepts are high computational complexity, high hardware requirements at the receiver, for example, amplifiers with high dynamic ranges and high performance analogue/digital converters are required. Moreover, high processing delays are introduced to the signal processing chain.

It is the objective of the present invention to provide an advanced concept for assigning spatial sub-channels of the MIMO radio channels for transmission, which is more efficient.

The object is achieved by a spatial sub-channel selection and pre-coding apparatus according to claim 1 and a method for selecting and pre-coding according to claim 18.

The present invention is based on the finding, that linear techniques can be used in embodiments as an alternative to the non-linear complex pre-coding operations. Although, in embodiments the optimum user scheduling may not always be achieved, they still yield a significant performance improvement when compared to concepts which can be implemented conventionally. Moreover, embodiments achieve a performance, which is close to the optimum solution, while circumventing, for example, computational involved operations as exhaustive searches over a large number of decomposed MIMO radio channels.

One of the main drawbacks of existing solutions to optimizing a sum capacity is the rather complicated user or spatial sub-channel selection. The number of data streams allocated to the users is either fixed a priori or the optimum solution can be only found via an exhaustive search. With embodiments of the present invention the complexity of the user selection can be drastically reduced at almost optimum performance. Embodiments may utilize a successive allocation of data streams. Besides the user or spatial sub-channel to be served, embodiments can determine the corresponding receive filter in each step as well. Finally zero-forcing beam formers can be applied in embodiments at the transmitter. Thus, embodiments may decompose the MIMO system into a system of effective scalar sub-channels with no multi-user interference.

Embodiments may provide a method to determine the allocation of served spatial sub-channels or users and the number of data streams allocated to them, receive and transmit filters for linear zero-forcing in the MIMO broadcast channel in an efficient non-iterative way.

Furthermore the computational complexity of the embodiments of methods is low when compared to the conventional solutions, as in embodiments the transmit pre-coder can be computed without matrix inversions and the test for termination, i.e. the test whether sum rate decreases by serving an additional user, can be conducted very easily.

Embodiments can provide the advantage of implicit user selection and utilizing only little extra complexity for test of termination. Moreover, in embodiments no explicit matrix inversions may be required.

In the following some of the embodiments of the present invention will be described in detail using the accompanying FIGS., in which FIG. 1a shows an embodiment of the spatial sub-channel selection and pre-coding apparatus in a general communication scenario;

Figure 4:
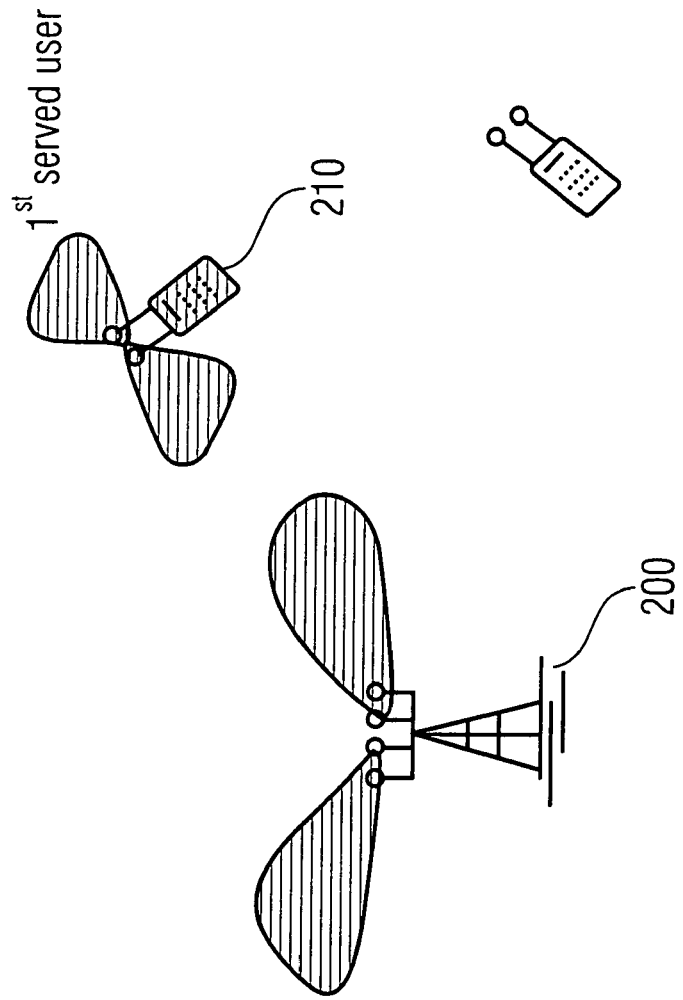
Figure 5:
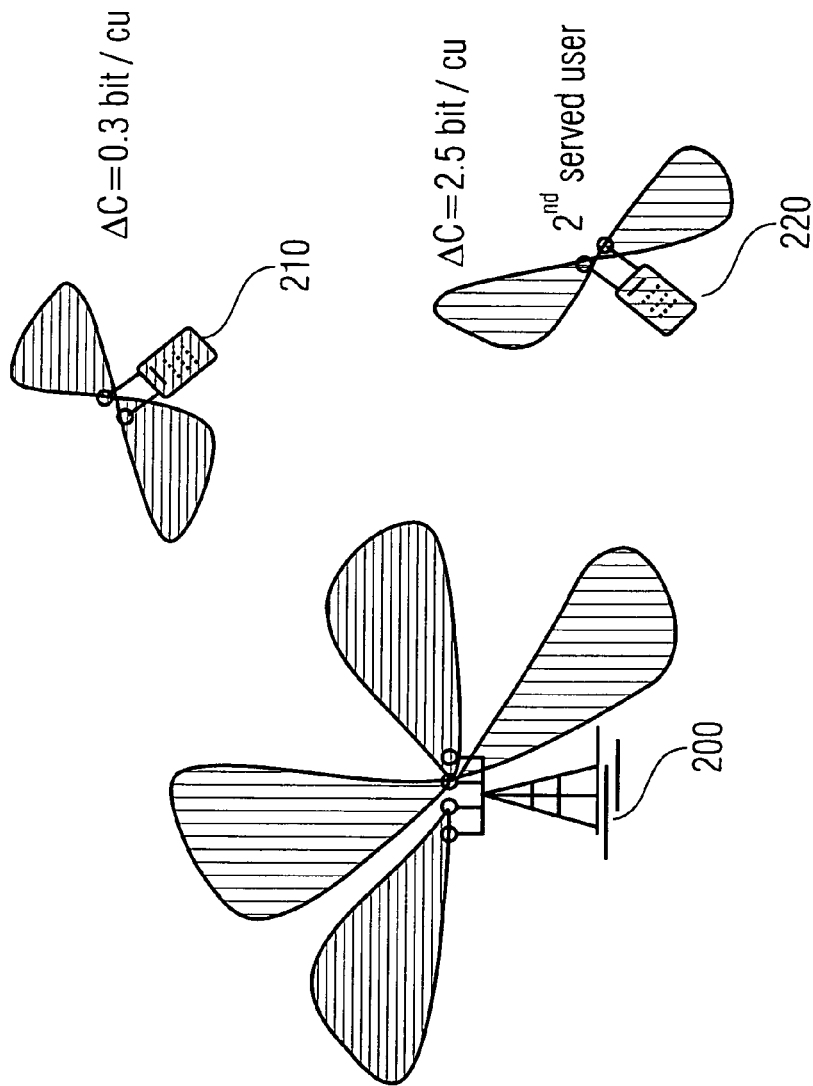
Figure 6A:
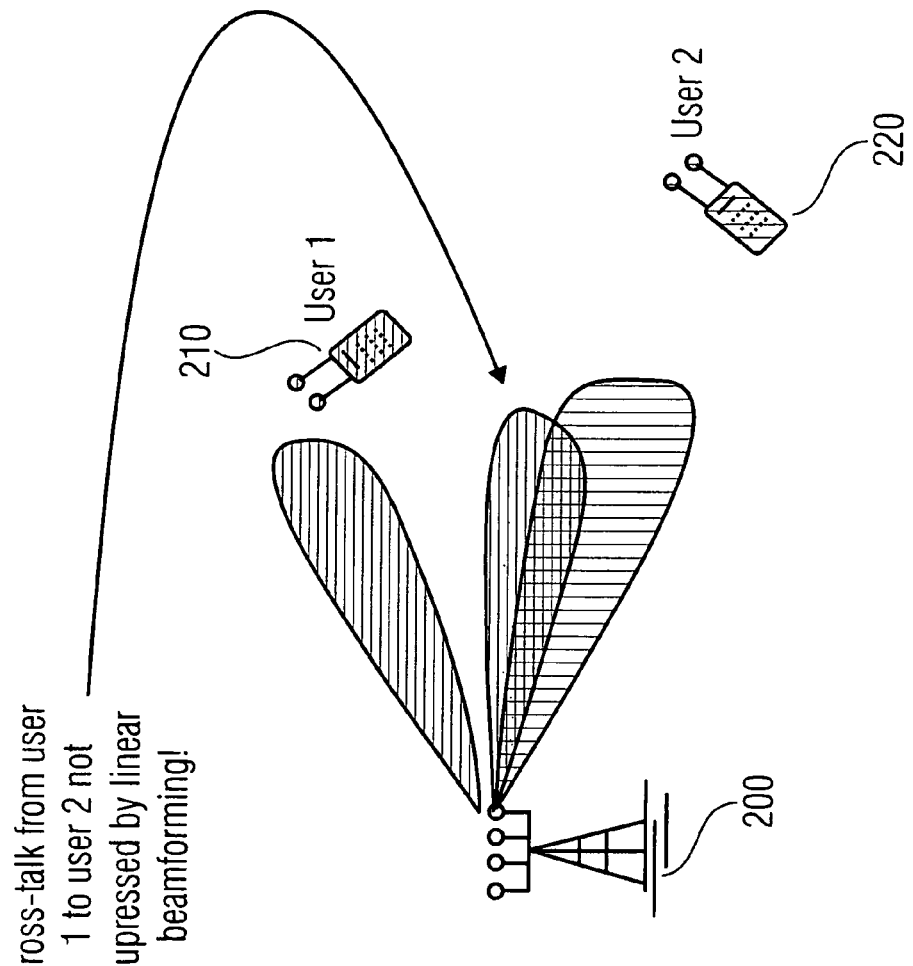
Figure 6A:
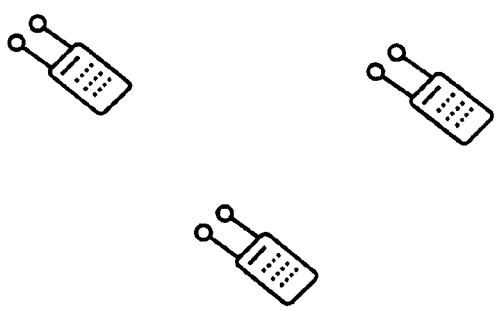
Figure 6B:
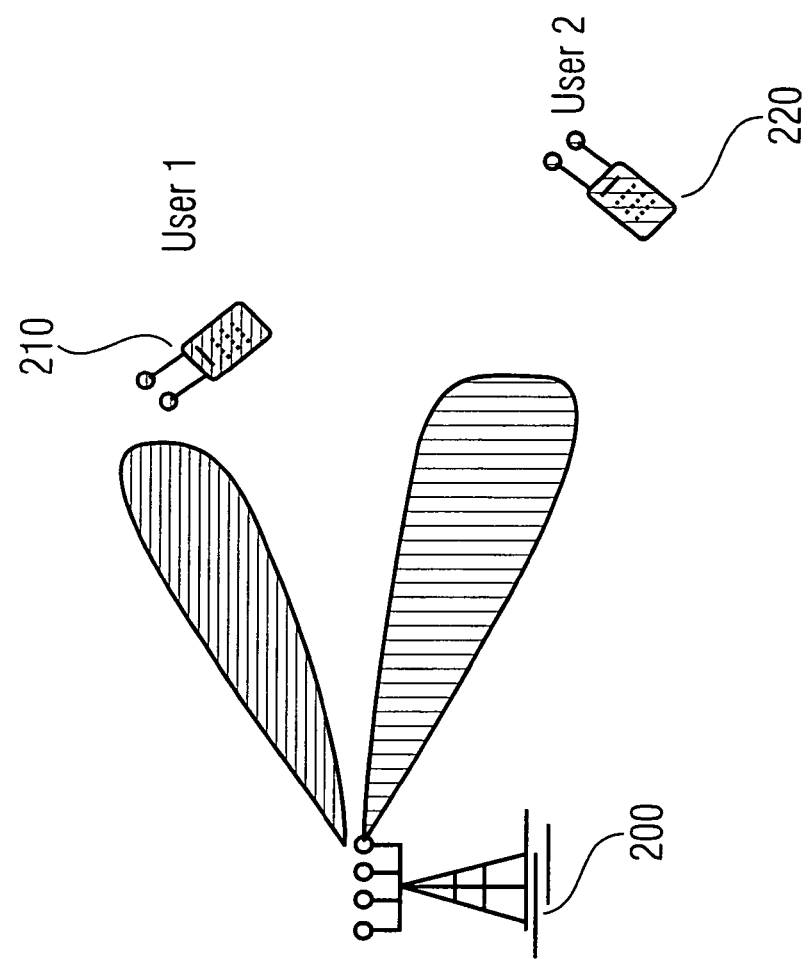
Figure 6B:
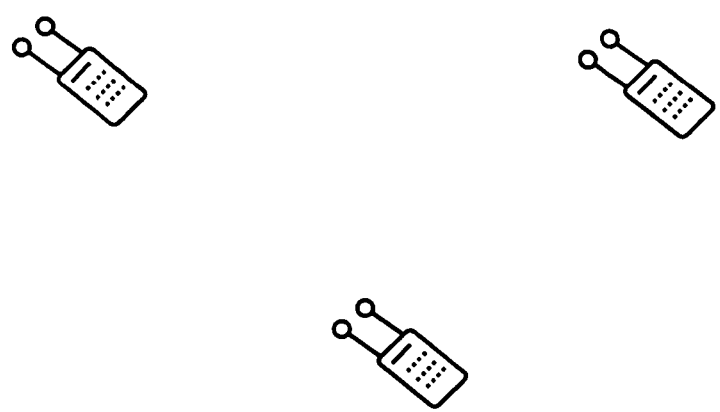
Figure 7:
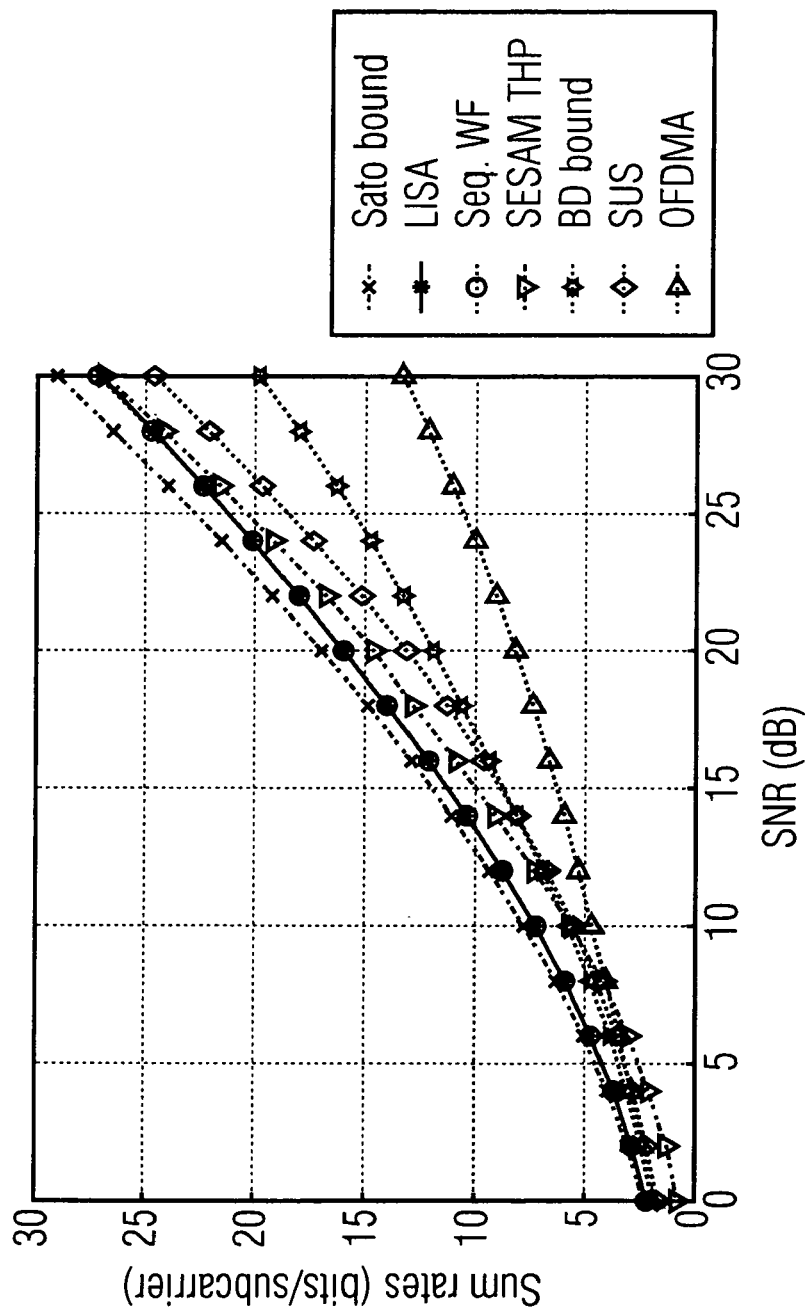

FIG. 4 exhibits a first state of an embodiment of a method for user selection;

FIG. 5 illustrates a second state of an embodiment of a method for user selection;

FIG. 6a shows a communication scenario illustrating cross talk;

FIG. 6b shows a communication scenario illustrating cross talk suppression by an embodiment;

FIG. 7 depicts a view graph illustrating simulation results; and

Figure 8:
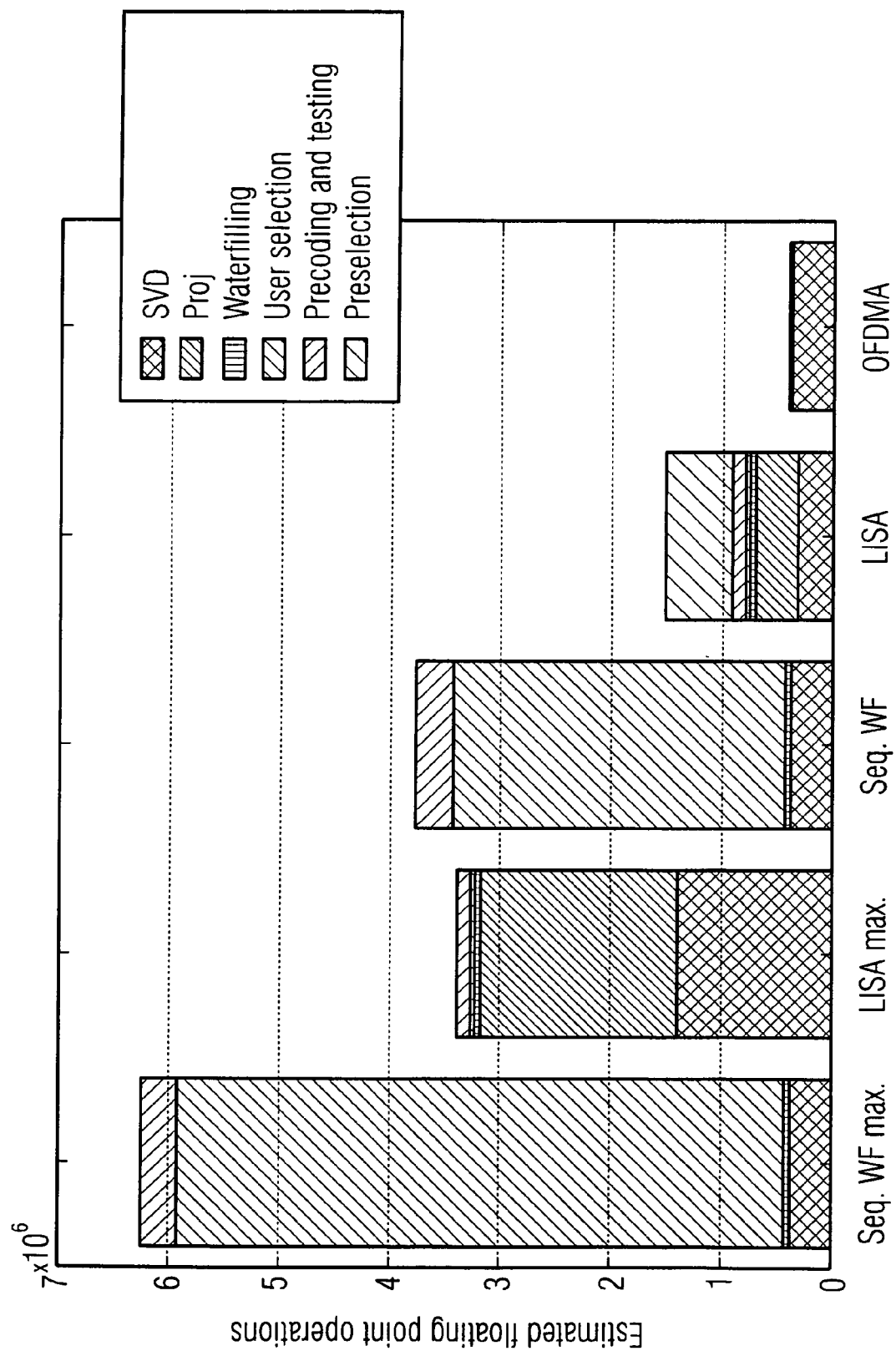

FIG. 8 shows a bar graph illustrating computational complexity for different user selection methods in MIMO communication scenarios.

In the following embodiments of a spatial sub-channel selection and pre-coding apparatus 100 and methods for spatial sub-channel selection and pre-coding will be detailed. It is to be noted that for selecting a user actually a spatial sub-channel of the respective user is selected for transmission to the respective user, a user may utilize multiple spatial sub-channels. Therefore selecting a user corresponds to selecting at least one sub-channel of said user and vice versa. The terms of sub-channel and user may therefore be used interchangeably. In some embodiments one user may utilize multiple spatial sub-channels and accordingly multiple spatial sub-channels of one user may be selected for transmission.

Figure 1A:
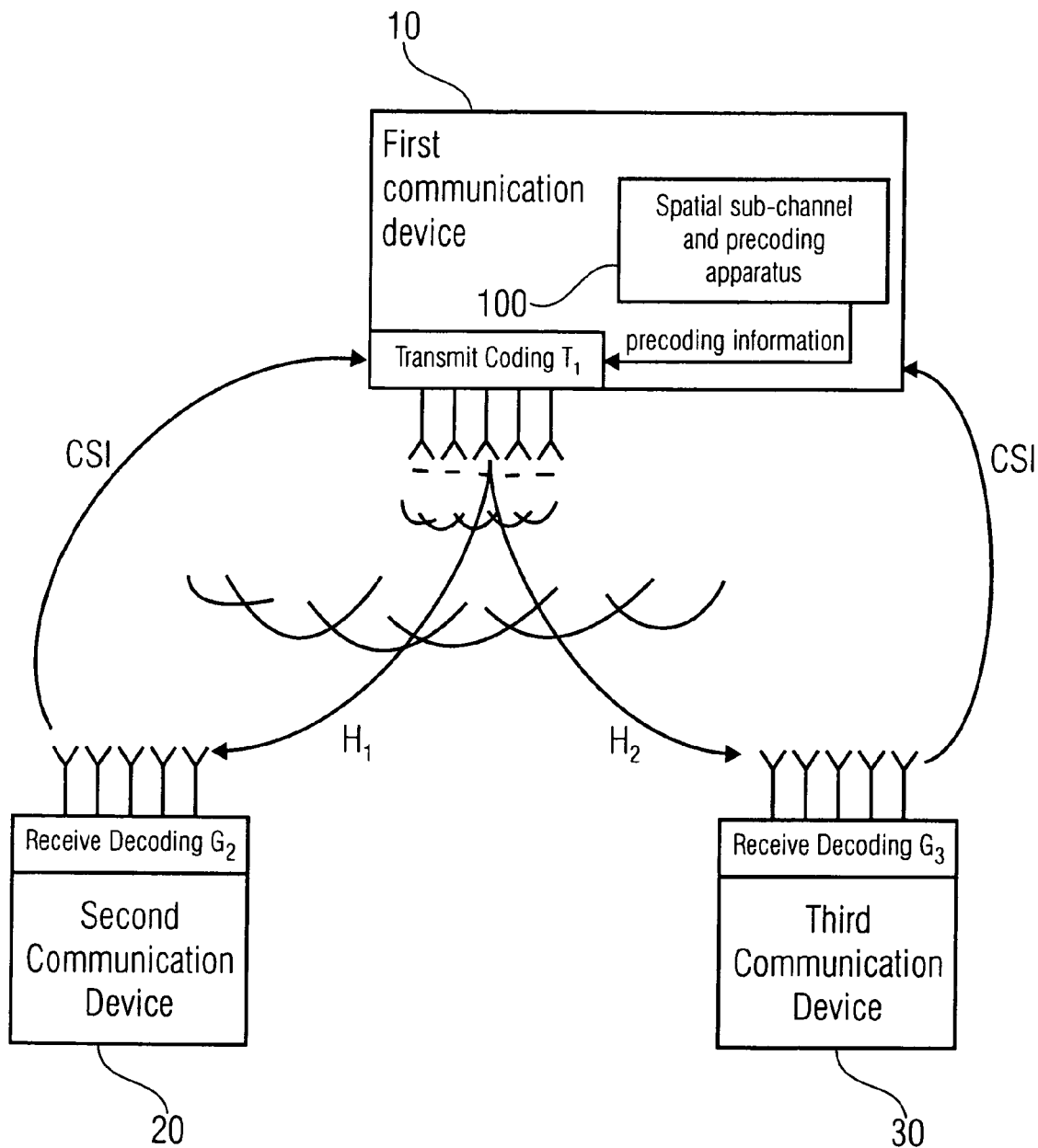
FIG. 1b shows an embodiment of the spatial sub-channel selection and pre-coding apparatus illustrating the MIMO radio channel processing.
FIG. 1c shows an embodiment of the spatial sub-channel selection and pre-coding apparatus.

FIG. 1a illustrates a principle scenario, where an embodiment of a spatial sub-channel selection and pre-coding apparatus 100 is utilized at a first communication device 10. As shown in FIG. 1a the first communication device utilizes multiple antennas for communication with a second communication device 20 and a third communication device 30. In the embodiments illustrated it is assumed that transmission is carried out from the first communication device 10 to the second communication device 20 and from the first communication device 10 to the third communication device 30. Embodiments are not restricted to this direction of transmission, they can similarly be utilized in the opposite transmission direction.

As can be seen in FIG. 1a the first communication device 10 has multiple transmit antennas and each of the second and third communication devices 20;30 may utilize multiple receive antennas. Consequently, there can be two MIMO radio channels, $H_1$ and $H_2$, one extending between the first communication device 10 and the second communication device 20 and the other one extending between the first communication device 10 and the third communication device 30. In the general scenario depicted in FIG. 1a the first communication device 10 carries out transmit coding or pre-coding of the signals transmitted to the second and third communication devices 20;30, which is represented by a transmit coding or pre-coding matrix $T_1$, respectively, which describes an according filter operation, in order to decrease or eliminate interference created for other spatial sub-channels selected for transmission.

The transmit coding or pre-coding matrix $T_1$ is updated based on pre-coding information provided by an embodiment of the spatial sub-channel selection and pre-coding apparatus 100. In the following it is assumed, that MIMO radio channels are represented by MIMO radio channel matrices, which are known, i.e. channel estimation is for example carried out by means of pilot symbols at a receiver and channel state information (CSI=Channel State Information) is provided to the transmitter, which is also indicated in FIG. 1a. Moreover, at the second and third communication devices 20;30 receive filtering or receive decoding is carried out, which is also represented by receive decoding matrices $G_2$ and $G_3$ in FIG. 1a.

Figure 1B:
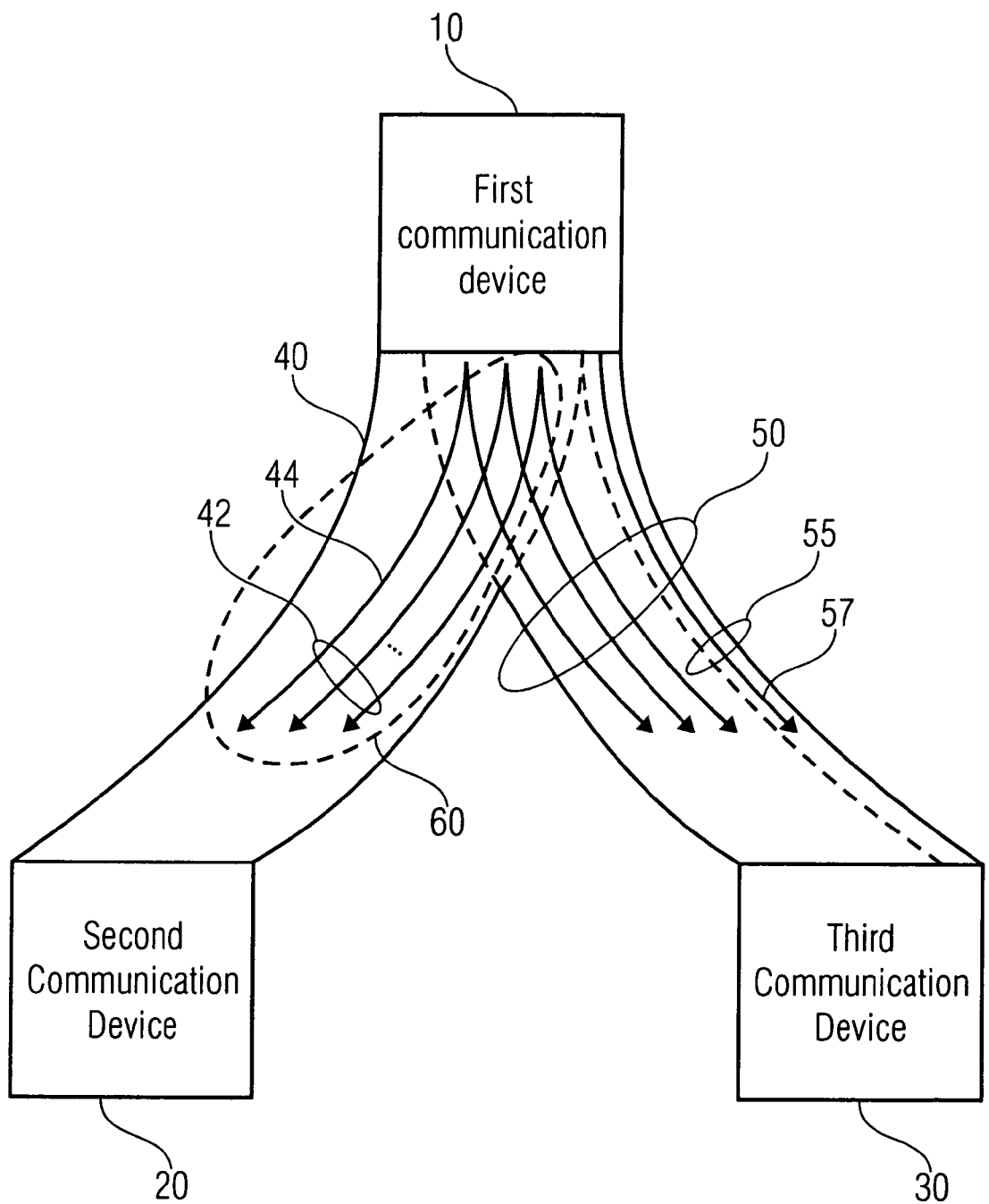

FIG. 1b illustrates a similar scenario, however illuminating the MIMO radio channel properties a bit more. FIG. 1b shows the first, second and third communication devices 10;20;30. Between the first communication device 10 and the second communication device 20 extends the first MIMO radio channel 40, comprising at least one spatial sub-channel 42, where the at least one spatial sub-channel is selected as first spatial sub-channel 44 for transmission, the selection can be based on a transmission capacity measure, which will be detailed further below. Between the first communication device 10 and the third communication device 30 there is a second MIMO radio channel 50, which is overlapping with the first MIMO radio channel 40 having at least one spatial sub-channel, wherein one of the first MIMO radio channel 40 or the second MIMO radio channel 50 has at least two spatial sub-channels.

In principal both, the first MIMO radio channel 40 and the second MIMO radio channel 50 may have a plurality of spatial sub-channels. For basic embodiments, however, either the first MIMO radio channel 40 or the second MIMO radio channel 50 has at least two spatial sub-channels. In the following a first embodiment will be detailed in which it is assumed that the first MIMO radio channel 40 has at least two spatial sub-channels, one of which being selected as first spatial sub-channel 44, i.e. the first MIMO radio channel 40 is decomposed into its at least two spatial sub-channels and one of the at least two spatial sub-channels is selected as first spatial sub-channel 44 for transmission.

Instead of directly using the second MIMO radio channel 50 for transmission a processed MIMO radio channel 55 may be utilized having at least one processed spatial sub-channel 57, on which transmission to the second communication device 20 creates reduced or eliminated interference with respect to the first spatial sub-channel 44 for transmission. For simplicity this is depicted in FIG. 1b as a non-overlapping part 55 of the first and second MIMO radio channels 40;50. In the basic embodiment wherein the second MIMO radio channel 50 may have only one spatial sub-channel, the processed MIMO radio channel 55 may correspond to one processed spatial sub-channel 57, which is selected as second spatial sub-channel 57 for transmission.

Moreover, in the embodiment the first communication device 10 has means for also decreasing or eliminating interference created by transmitting on the first spatial sub-channel 44 with respect to the second communication device 20, by means of pre-coding, which is indicated by the schematic beam 60 in FIG. 1b serving only spatial sub-channels in direction of the second communication device 20 and no spatial sub-channels in direction of the third communication device 30. Since it is assumed that the first communication device 10 operates at least two transmit antennas interference suppression on the second spatial sub-channel may be carried out by beam forming the transmission on the first spatial sub-channel 44, for example in terms of steering a spatial null towards the second spatial sub-channel 57. Further spatial sub-channels can be selected for transmission, i.e. in the present embodiment another spatial sub-channel from the first MIMO radio channel may be selected for transmission, however, similarly being beam formed to create reduced or eliminated interference with respect to the second spatial sub-channel 57.

As mentioned above, in another basic embodiment the first MIMO radio channel 40 may have only one spatial sub-channel, which is selected as first spatial sub-channel 44. In this embodiment, the second MIMO radio channel has at least two spatial sub-channels, where instead of directly using the second MIMO radio channel 50 for transmission a processed MIMO radio channel 55 may be utilized having at least two processed spatial sub-channels, on which transmission to the second communication device 20 creates reduced or eliminated interference with respect to the first spatial sub-channel 44 for transmission, one of which is then selected as second spatial sub-channel 57 for transmission. For simplicity this is depicted in FIG. 1b as a non-overlapping part 55 of the first and second MIMO radio channels 40;50.

Similarly to what was described above, pre-coding information may be used for decreasing or eliminating interference created by transmitting on the first spatial sub-channel 44 with respect to the second communication device 20, which is indicated by the schematic beam 60 in FIG. 1b serving only spatial sub-channels in direction of the second communication device 20 and no spatial sub-channels in direction of the third communication device 30. Since it is assumed that the first communication device 10 operates at least two transmit antennas interference suppression on the second spatial sub-channel 57 may be carried out by beam forming the transmission of the first spatial sub-channel 44, for example in terms of steering a spatial null towards the second spatial sub-channel 57.

Further spatial sub-channels can be selected for transmission, i.e. in the present embodiment another processed spatial sub-channel from the second MIMO radio channel 50 may be selected. Another pre-coding information may be generated in order to also reduce or eliminate interference generated by the transmission on the first spatial sub-channel 44 with respect to the other selected spatial sub-channels for transmission. In other words beam forming for the transmission on the first spatial sub-channel 44 may be carried out steering two spatial nulls towards the second MIMO radio channel 50, one spatial null towards the second spatial sub-channel 57 and another spatial null towards the other selected spatial sub-channel. It is to be noted that in this embodiment at least three transmit antennas are utilized at the first communication device in order to enable two spatial nulls to be steered.

Figure 1C:
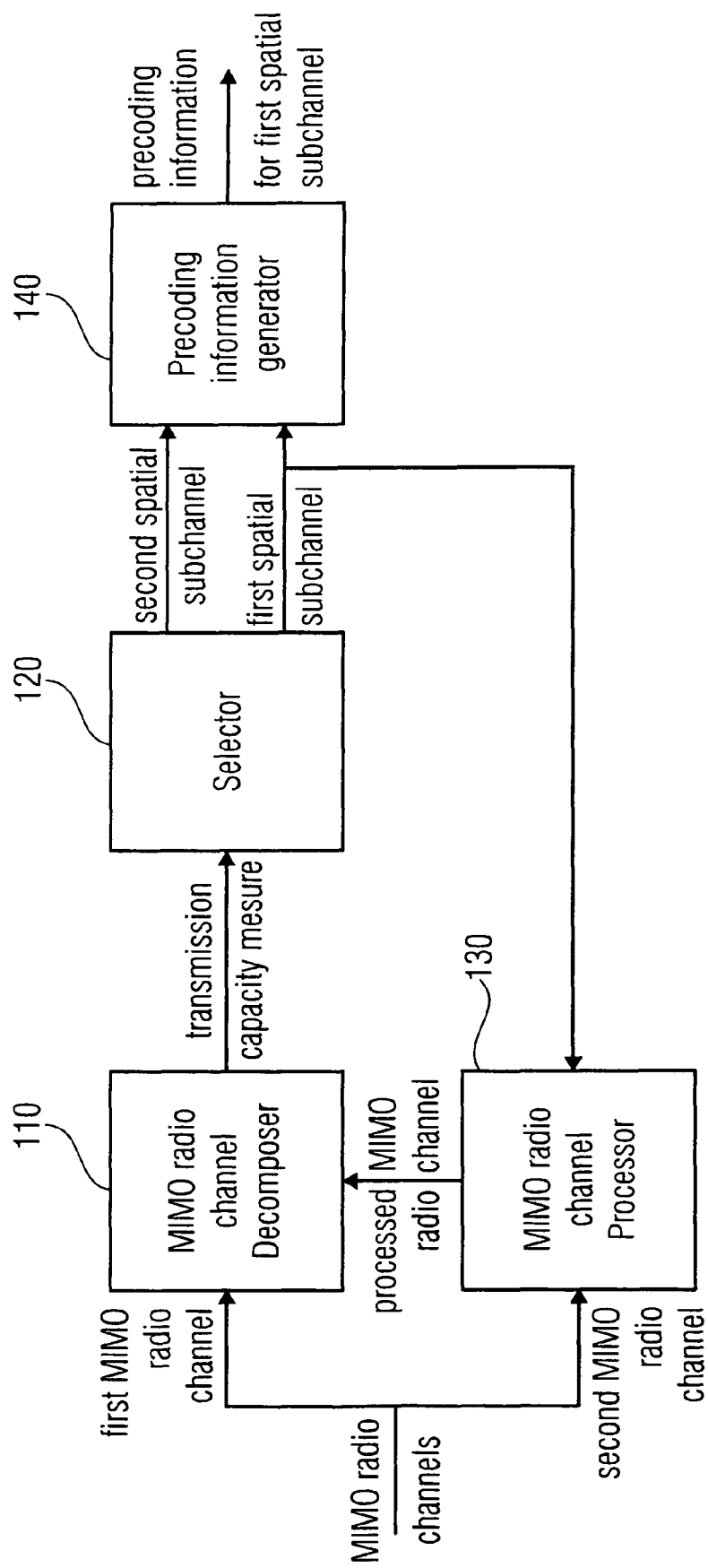

FIG. 1c shows an embodiment of a spatial sub-channel selection and pre-coding apparatus 100 for being operative in the first communication device 10, the first communication device 10 being adapted for communicating with the second and the third communication device 20;30 using MIMO (MIMO=Multiple-Input-Multiple-Output) radio channels 40;50, the first MIMO radio channel 40 extending between the first communication device 10 and the second communication device 20 having at least one spatial sub-channel 42, the second MIMO radio channel 50 extending between the first communication device 10 and the third communication device 30 having at least one spatial sub-channel, wherein one of the first MIMO radio channel 40 or the second MIMO radio channel 50 has at least two spatial sub-channels. The scenario is detailed above using FIG. 1a and FIG. 1b. The spatial sub-channel selection and pre-coding apparatus 100 comprises a MIMO radio channel decomposer 110 for decomposing the first MIMO radio channel 40 or the second MIMO radio channel 50 into a plurality of spatial sub-channels 42 and for providing a transmission capacity measure for each of the spatial sub-channels. In other words the MIMO radio channel having the at least two spatial sub-channels is decomposed into said at least two sub-channels.

The spatial sub-channel selection and pre-coding apparatus 100 further comprises a selector 120 for selecting the first spatial sub-channel 44 for transmission based on the transmission capacity measures from the plurality of spatial sub-channels 42, where other spatial sub-channels not selected by the selector 120 are non-selected spatial sub-channels. Moreover, the spatial sub-channel selection and pre-coding apparatus 100 comprises a MIMO radio channel processor 130 for processing the first MIMO radio channel 40 or the second MIMO radio channel 50 based on the first spatial sub-channel 44 to obtain a processed MIMO radio channel 55 having a least one non-selected processed spatial sub-channel in a way such that a possible interference on the first spatial sub-channel 44 caused by the at least one non-selected processed spatial sub-channel is reduced or eliminated.

Furthermore, the selector 120 is adapted for selecting a non-selected processed spatial sub-channel of the processed MIMO radio channel 55 as second spatial sub-channel 57 for transmission. The spatial sub-channel selection and pre-coding apparatus 100 further comprises a pre-coding information generator 140 for generating a pre-coding information for the first spatial sub-channel 44 in such a way that an interference on the second spatial sub-channel 57 caused by the first spatial sub-channel 44 is decreased or eliminated.

In embodiments the MIMO radio channel decomposer 110 can be adapted for evaluating a transmission capacity measure for each of the processed spatial sub-channels and the selector 120 can be adapted for selecting the second spatial sub-channel 57 for transmission from the non-selected processed spatial sub-channels, based on a transmission capacity measure of the processed spatial sub-channels.

In embodiments the first MIMO radio channel 40 and/or the second MIMO radio channel 50 may comprise a plurality of spatial sub-channels and the selector 120 can be adapted for selecting a spatial sub-channel for transmission for which the transmission capacity measure is higher than the lowest transmission capacity measure of the plurality of spatial sub-channels or processed spatial sub-channels. Generally, embodiments may involve a plurality of communication devices, all of which potentially communicating with the first communication device 10 and all of which potentially using MIMO radio channels comprising a plurality of spatial sub-channels. In other words, the MIMO radio channels can be decomposed in spatial sub-channels, the processed MIMO radio channel 55 can be decomposed in processed spatial sub-channels. As a quality or transmission capacity measure, indicating for example a transmission capacity or a data rate or an achievable signal-to-noise-ratio (SNR=Signal-to-Noise-Ratio), a channel gain or attenuation, etc., a transmission capacity measure is utilized. Moreover, a Frobenius norm of a MIMO radio channel matrix representing a MIMO radio channel or a reciprocal of a Frobenius norm of a pseudo inverse of an effective MIMO radio channel matrix may be utilized as transmission capacity measure, where the effective MIMO radio channel matrix takes pre-coding or receive decoding into account.

The selector 120 may select among all non-selected spatial sub-channels, the spatial sub-channel, for which the transmission capacity measure, i.e., a transmission capacity, is not the lowest. In terms of transmission capacity, the selector 120 can be adapted for not selecting the worst transmission channel.

In embodiments, the selector 120 can be adapted for selecting the spatial sub-channel as the first or second spatial 44;57 sub-channel for transmission for which the transmission capacity measure is the highest transmission capacity measure from the plurality of spatial sub-channels or processed spatial sub-channels, respectively. In embodiments, the selector 120 can be adapted for selecting only one spatial sub-channel per user, i.e., in some embodiments, the selector 120 may be adapted for not selecting two spatial sub-channels from the same user for transmission. However, in other embodiments, the selection may be carried out based on sub-channels only, i.e., multiple sub-channels of the same user may also be selected for transmission.

In embodiments, the user selection apparatus 100 may further comprise a sum capacity evaluator for evaluating a first sum capacity measure on the MIMO radio channels 40;50 based on the first spatial sub-channel 44 and for evaluating a second sum capacity measure on the MIMO radio channels 40;50 based on the first and the second spatial sub-channels 44;57.

In other words, in embodiments a sum capacity may be considered by comparing a transmission capacity resulting if only the first spatial sub-channel 44 is utilized for transmission to a transmission capacity resulting if transmission resources are shared between the first and the second spatial sub-channel 44;57.

In embodiments the selector 120 may be adapted for de-selecting the second spatial sub-channel 57 from transmission, when the second sum capacity measure indicates a lower sum capacity on the MIMO radio channels 40;50 than the first sum capacity measure.

In embodiments the user selection apparatus 100 may carry out an iteration. In each iteration step, another spatial sub-channel can be selected for transmission. However, in each step of the iteration, a sum capacity or a total capacity of the transmission is considered, respectively. During a first iteration step, for example, the spatial sub-channel with the highest transmission capacity measure is selected for transmission as first spatial sub-channel 44. The sum capacity then results, when all transmission resources, for example, power resources, code resources, frequency resources, spatial resources etc., are allocated to this spatial sub-channel. During the second iteration step, another spatial sub-channel is selected as second spatial sub-channel 57 for transmission. The second spatial sub-channel 57, however, can be selected from a sub-space, i.e. from a processed version 55, of the second MIMO radio channel 50, represented by a processed MIMO radio channel matrix.

Therefore, the sum capacity when the two spatial sub-channels 44;57 are selected results from dedicating some transmission resources to the first spatial sub-channel 44, taking into account the pre-coding information for it, and dedicating some transmission resources to the second spatial sub-channel 57. In some embodiments, only if the sum capacity measure of the latter case is higher than the sum capacity measure for the case when only the first spatial sub-channel 44 is selected, the iteration is continued. Otherwise, the second spatial sub-channel 57 is de-selected and transmission is only carried out for the first spatial sub-channel 44.

In embodiments, when the iteration is continued, a third spatial sub-channel can be evaluated, however now considering a sub-space or processed version of the MIMO radio channels 40;50, for which the interference on the first and the second spatial sub-channels caused by the potential third spatial sub-channels is decreased or eliminated.

In embodiments, the MIMO radio channel decomposer 110 can be adapted for decomposing the MIMO radio channels 40;50 or processed MIMO radio channel 55 by utilizing a singular value decomposition (SVD=Singular Value Decomposition) or an Eigen value decomposition of a MIMO radio channel matrix H representing the MIMO radio channels 40;50 or processed MIMO radio channels 55. In embodiments, the MIMO radio channel decomposer 110 may be adapted for providing a singular value or an Eigen value as the transmission capacity measure. Consequently, in embodiments the selector 120 may be adapted for selecting the first spatial sub-channel 44 or second spatial sub-channel 57 based on a maximum singular value or Eigen value of the plurality of sub-channels 42.

In embodiments, the MIMO radio channel processor 130 can be adapted for obtaining the processed MIMO radio channel 55 by projecting the MIMO radio channel 50 of users for which no spatial sub-channel was selected into a sub-space based on the properties of the MIMO radio channel 40 of the user having the first spatial sub-channel 44. In embodiments, said sub-space may correspond to a null space, i.e., all potential second spatial sub-channels, do theoretically not create any interference to the first spatial sub-channel 44, since they are selected from an orthogonal sub-space. In practice the projected or processed MIMO radio channel may create decreased interference with respect to the selected users or spatial sub-channels.

In embodiments, the pre-coding information generator 140 may be adapted for generating a linear pre-coding information in terms of a linear pre-coding operation. Said linear pre-coding operation could, for example, be a beam forming operation, i.e., the pre-coding information generator could be adapted for generating coefficients for a beam forming vector, in terms of a weighting vector corresponding to an array of antennas or multiple antennas, respectively. In other embodiments, the pre-coding information generator 140 can be adapted for generating coefficients for a zero-forcing beam forming filter (ZFBF=Zero Forcing Beam Forming) with respect to the second spatial sub-channel 57.

In other words, in an embodiment the first spatial sub-channel 44 may be selected in terms of a maximum singular value or Eigen value. The receive filter at the potential receiver can be chosen according to a left hand singular vector of the singular value decomposition of the MIMO radio channel 40;50 the first spatial sub-channel was selected from, represented by the MIMO channel matrix H. For example, the receive filter may be chosen according to the left hand singular vector corresponding the maximum singular value. This will ensure that when projecting the rest of the MIMO radio channel matrices into a sub-space, determined by the right hand singular vector, all spatial sub-channels selected from said sub-space, i.e., using receive filters obtained from said sub-space, may in embodiments assure, that all later selected users do not create any interference for the previously selected users. The right hand singular vector corresponds to the chosen respective left hand singular vector, for example, the right hand singular vector also corresponds the maximum singular value. In other words, embodiments may utilize the projection to make sure that a second spatial sub-channel 57 does not disturb the first spatial sub-channel 44, however, not the other way around.

This is the point, where conventional concepts, for example SESAM, utilize DPC in order to suppress interference created by the first selected spatial sub-channel 44 to the second spatial sub-channel 57. In embodiments, this may be carried out by linear filtering, for example, by beam forming, i.e., filtering a transmit signal to the first spatial sub-channel 44 in a way that a spatial null, also called spatial interference cancellation, is directed towards the second spatial sub-channel channel 57. In embodiments, the iteration may be carried out, until an evaluated sum capacity does not increase any more.

Figure 2:
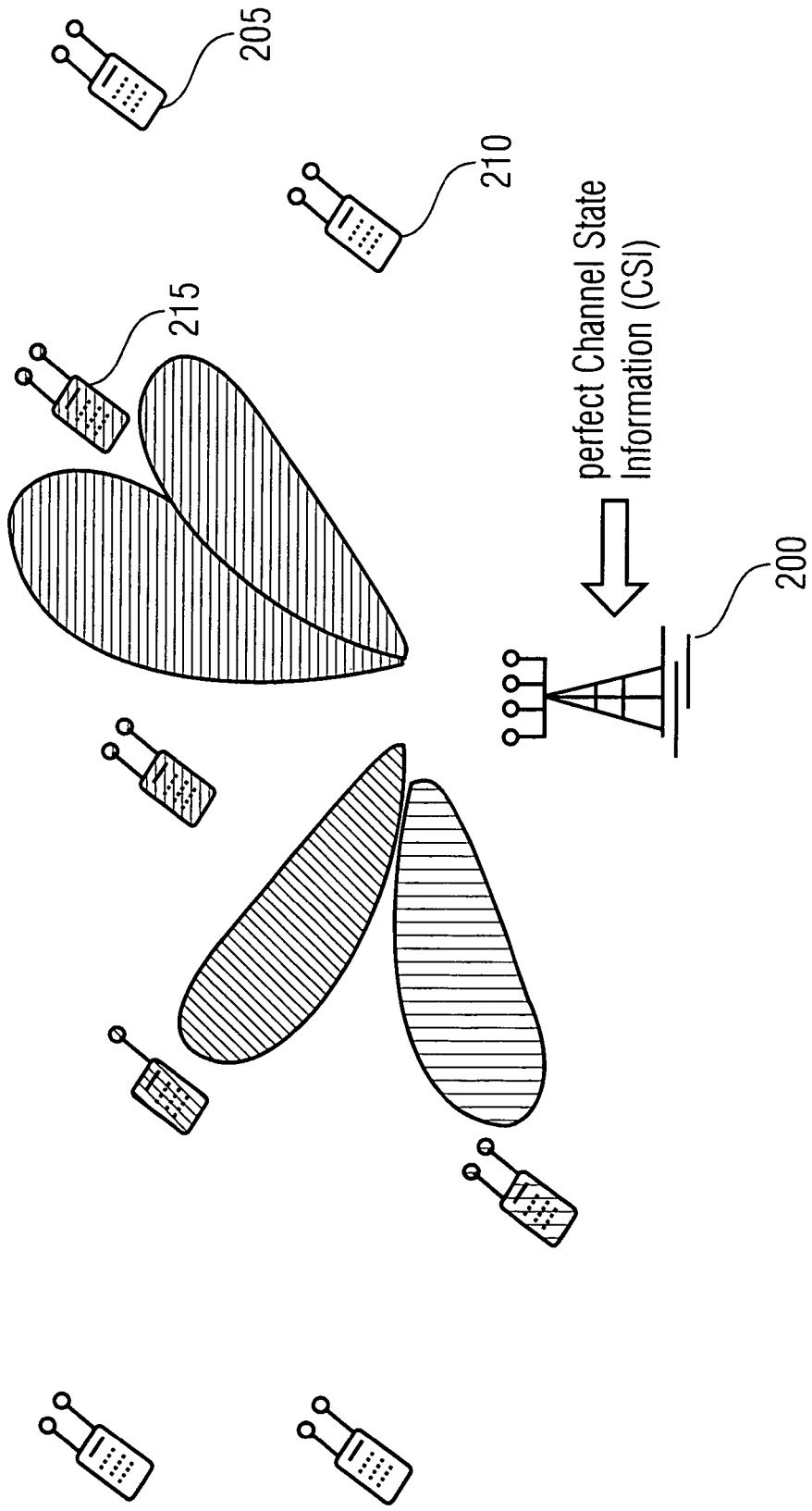
FIG. 2 illustrates a communication scenario.

FIG. 2 illustrates a MIMO radio channel transmission scenario, for which an embodiment will be detailed in the following. FIG. 2 shows a base station 200 and a plurality of mobile stations, as for example 205, 210 and 215. From FIG. 2 it can be seen that at the base station 200 multiple antennas are utilized, as well as at the mobile stations 205, 210 and 215. Moreover, FIG. 2 indicates that in the following it will be assumed that full channel state information (CSI=Channel State Information) will be available at the spatial sub-channel selection and pre-coding apparatus 100. In the following, considerations will be carried out for the downlink i.e., for the direction transmitting signals from a base station to a mobile station. In a similar and straightforward way, all considerations can also be carried out for the uplink, i.e., for the transmission direction from a mobile station to a base station. Embodiments detailed in the following refer to both transmission directions.

Figure 3:
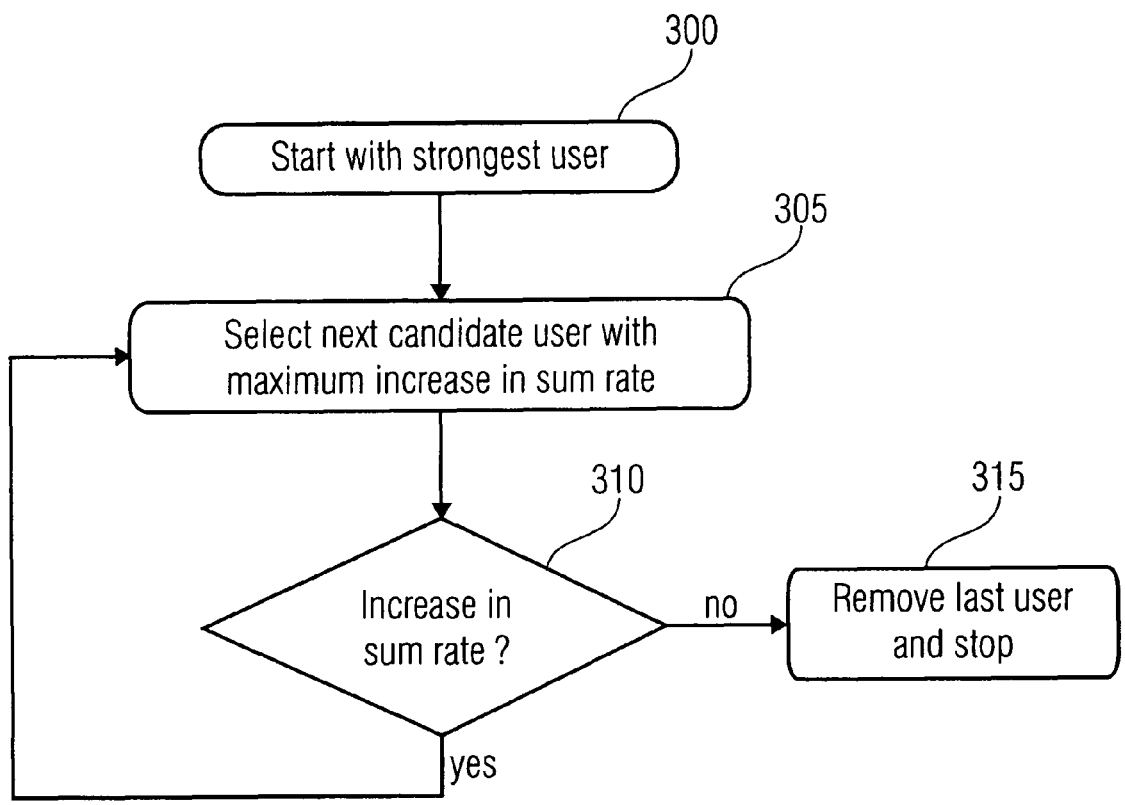
FIG. 3 shows a flow chart of an embodiment of a user selection method.

FIG. 3 shows a flow chart of an embodiment of a method for selecting a spatial sub-channel for transmission. The method may start, for example, in step 300 and select the strongest user, the strongest spatial sub-channel respectively, for example, according to the above description by evaluating transmission capacity measure of the MIMO radio channel's spatial sub-channels and selecting the strongest spatial sub-channel. The method may then continue in step 305 by selecting the next candidate user with the maximum increase in sum capacity. This may be complex, as many combinations of different users may have to be considered, i.e., especially when carrying out linear pre-coding concepts, an exhaustive search may be necessary. In step 310 it may be checked whether the sum rate has increased and if so, another candidate may be selected in step 305. If the sum rate has not increased, the last selected candidate may be deselected or removed in step 315, upon which the user selection, spatial sub-channel selection, respectively, is completed.

FIGS. 4 and 5 may illuminate the embodiment of the user selection method more. FIG. 4 shows a base station 200 and a number of mobile stations, upon which the mobile station 210 has been selected first for service. Mobile station 210 is the first served user, i.e. the user of which's MIMO radio channel the first spatial sub-channel 44 was selected from. In this embodiment, for example, the receive filters at the mobile stations may be fixed from the beginning, i.e., in one embodiment the mobile stations may carry out beam forming measures by themselves and set the receive filters in a way that beams are steered towards the base station 200, as it is indicated in FIG. 4 by the beam pointing from the mobile station 210 to the base station 200.

In one embodiment, all mobile stations may be considered in an exhaustive search as being the second selected user, i.e. the user for which the second spatial sub-channel is to be selected. This is indicated in FIG. 5. FIG. 5 shows again the base station 200 and the first selected user 210. For all other users, increases in data rates are considered, given as $\Delta C$, resulting from an exhaustive search, whereupon mobile station 220 is chosen as second selected user, i.e. a spatial sub-channel therefrom, respectively, as having the largest sum capacity increase. However, in this embodiment, matrix inversions may be necessary for each considered second user, i.e., computations of new transmit beams for every combination of users are required. After having selected the second user as indicated in FIG. 5, more users may be selected. On the basis of the first two selected users, all sum capacity increases for all other users, need to be evaluated, indicating the computational complexity of this embodiment.

FIG. 6a shows another scenario, involving base station 200 and two selected users 210 and 220. In this scenario the conventional SESAM algorithm is considered, having a drawback that there is a cross talk from user 1 to user 2, which is not suppressed by linear beam forming, for example, as according to an embodiment of the present invention. According to conventional SESAM, DPC is utilized in order to suppress the cross talk, by canceling the interference created by the signal dedicated to user 1 propagating the radio channel and spatial sub-channel of user 2 and causing interference for user 2, for example, by preliminary subtraction of said interference from the signal dedicated to user 2.

In embodiments of the present invention, users and receive filters may be determined successfully according to SESAM, however, instead of applying transmit vectors determined by SESAM, zero forcing transmit beam formers to remove the remaining cross talk may be utilized. FIG. 6b shows a scenario according to one embodiment. The scenario shown in FIG. 6b illustrates this case, at the base station 200 cross talk is suppressed using transmit beam forming. Embodiments may therewith take advantage of linear pre-coding.

Embodiments of the present invention may utilize linear approaches, where the multiuser-interference is minimized or completely canceled solely by means of linear signal processing. Embodiments of the present invention may therefore be of high practical relevance. Introducing zero-forcing constraints, as they can be provided by the pre-coding information generator 140, i.e. each user may experience no interference from other users, the problem of maximizing sum rate can be written as $$\max_{G_k,T_k,\Gamma_k} \sum_{k=1}^{K} R_k(G_k, T_k, \Gamma_k) = \sum_{k=1}^{K} \log|I + G_k^H H_k T_k \Gamma_k T_k^H H_k^H G_k| \quad (1.1)$$

$$\text{s.t.} \sum_{k=1}^{K} tr(T_k \Gamma_k T_k^H) \leq P_{Tx}), G_k^H H_k T_i \Gamma_i = 0, \forall k, \forall i \neq k,$$

wherein $G_k$ and $T_k$ denote the receive filter of user k and the pre-coder or pre-coding information for user k with normalized columns, respectively. $\Gamma_i$ are diagonal matrices, whereas the elements on the diagonal constitute the powers allocated to the corresponding data streams. The noise is assumed to be additive white Gaussian with unit covariance. Note that in (1.1) zero-forcing is conducted with respect to interuser interference, not with respect to interference between data streams allocated to the same user. The zero-forcing conditions $G_k^H H_k T_i \Gamma_i = 0$ in (1.1) can only be fulfilled, if $$\text{rank}\begin{pmatrix} G_1^H H_1 \\ \vdots \\ G_K^H H_K \end{pmatrix} = \text{rank}\begin{pmatrix} T_1 \Gamma_1 \\ \vdots \\ T_K \Gamma_K \end{pmatrix} \leq M_{Tx}. \quad (1.2)$$

In case $$\sum_{k=1}^{K} M_{Rx,k} \leq M_{Tx},$$

which is atypical for practical systems, (1.2) constitutes no critical condition, as each user can be served with the maximum amount of $M_{Rx,k}$ data streams supported by the system. Otherwise (1.1) implies a combinatorial optimization problem consisting of finding the optimum allocation of data streams to users by fulfilling (1.2).

Currently there are several approaches available to solve (1.1). In L. U. Choi, M. T. Ivrlac, R. D. Murch, and J. A. Nossek, Joint Transmit and Receive Multi-User MIMO Decomposition Approach for the Downlink of Multi-User MIMO Systems, In Proc. of *IEEE 58th Vehicular Technology Conference*, 2003, it is assumed that the number of data streams assigned to a user is fixed such that (1.2) is fulfilled. Then the optimum transmit and receive filters are determined iteratively. In each iteration transmit and receive filters are alternately kept fixed, while the other filters are optimized. Embodiments may converge towards the optimum solution.

Block Diagonalization (BD), cf. Q. H. Spencer, A. L. Swindlehurst, and M. Haardt, Zero-forcing Methods for Downlink Spatial Multiplexing in Multiuser MIMO Channels, *IEEE Trans. on Signal Processing*, 52(2):461-471, February 2004, assigns to a certain user either no or the maximum number, i.e. $M_{Rx,k}$, data streams. The optimum user selection is conducted by an exhaustive search, suboptimum heuristic user selection methods have been presented in Z. Shen, R. Chen, J. G. Andrews, R. W. Heath, and B. L. Evans, Low Complexity User Selection Algorithms for Multiuser MIMO Systems with Block Diagonalization, *IEEE Transactions on Signal Processing*, 54(9):3658-3663, September 2006, and M. Fuchs, G. Del Galdo, and M. Haardt, Low-Complexity Space-Time—Frequency Scheduling for MIMO Systems With SDMA, *IEEE Transactions on Vehicular Technology*, 56:2775-2784, September 2007. Each selected user transmits then in the null space of the other selected users' channels.

Embodiments may extend the concept of Zero-Forcing Beamforming (ZFBF), which has been proposed for Multiple-Input Single-Output (MISO) systems in G. Caire and S. Shamai, On the Achievable Throughput of Multiantenna Gaussian Broadcast Channel, *IEEE Transactions on Information Theory*, 49(7):1691-1706, July 2003, to MIMO systems. The left singular vectors of each user's channel matrix can be applied as receive filters, and each resulting product of singular value and corresponding right singular vector is considered as a separate MISO system for computing the transmit filter vectors. The transmitter, or the spatial sub-channel selection and pre-coding apparatus 100 selects up to $M_{Tx}$ of such MISO channels for transmission, the transmitter applies a scaled pseudo-inverse of the composed channel as precoder and performs water-filling, cf.

M. T. Cover and J. A. Thomas, *Elements of Information Theory*, John Wiley & Sons, 1991, over the resulting scalar sub-channels. The optimum user selection can again be found by an exhaustive search, therefore several heuristic approaches are proposed in the literature.

In T. Yoo and A. Goldsmith, On the Optimality of Multiantenna Broadcast Scheduling Using Zero-Forcing Beamforming, *IEEE Journal on Selected Areas in Communications*, 24(3):528-541, March 2006, the first selected user is the user with the maximum singular value. Then users are successively added, where in each step the equivalent MISO channel is taken which exhibits the maximum channel gain in the sub-space orthogonal to the previously allocated MISO channels. A pre-selection based on an orthogonality criterion reduces the search complexity. The same authors resort to a clique search from graph theory in T. Yoo and A. Goldsmith, Sum-Rate Optimal Multi-Antenna Downlink Beamforming Strategy Based on Clique Search, In *Proc. of Global Telecommunications Conference (GLOBECOM)*, 2005, to select the set of users to be served.

In G. Dimić and N. D. Sidoropoulos, On Downlink Beamforming with Greedy User Selection, *IEEE Transactions on Signal Processing*, 53(10):3857-3868, October 2005, the user set is also determined successively, where in each step the user is added one of which equivalent MISO channels leads to the maximum increase in sum rate. A general description of the algorithm for MIMO systems with an asymptotic analysis can be found in F. Boccardi and H. Huang, A Near-optimum Technique Using Linear Pre-coding for the MIMO Broadcast Channel, In *Proc. of IEEE International Conference on Acoustics, Speech, and Signal Processing (ICASSP)*, 2007.

A method to reduce the complexity of this greedy approach has been developed in J. Wang, D. L. Love, and M. Zoltowski, User Selection for MIMO Broadcast Channel with Sequential Water-Filling, In *Proc. of 44th Annual Allerton Conf. on Communications, Control, and Computing*, 2006.

The user allocation and determination of receive filters may in embodiments be conducted as with the Successive Allocation Successive Encoding Method (SESAM), cf.

P. Tejera, W. Utschick, G. Bauch, and J. A. Nossek, Sub-channel Allocation in Multiuser Multiple Input Multiple Output Systems, *IEEE Transactions on Information Theory*, 52:4721-4733, October 2006.

The user selected by the selector 120 at first, the first spatial sub-channel 44 respectively, which will be denoted as user $\pi(1)$ in the following, is the user which's channel exhibits the maximum principal singular value according to an embodiment. The receive filter $u_{\pi(1)}$ is the corresponding left singular vector, i.e.

$$\{\pi(1), u_{\pi(1)}, v_{\pi(1)}\} = \arg\max_{k,u,v} u^H H_k v,$$

$$\text{s.t.} \quad u^H u = 1, v^H v = 1.$$

$v_{\pi(1)}$ denotes the transmit filter that would be used if SESAM was applied. In the following steps the MIMO radio channel processor 130 may first project each user's channel, i.e. the non-selected spatial sub-channels, in the null space of the previously determined vectors $v_{\pi(j)}$, $j<i$ by the projection matrix $$P_i = I - \sum_{j=1}^{i-1} v_{\pi(j)} v_\pi^H(j). \tag{1.3}$$

If the $v_{\pi(i)}$ are directly applied as transmit filters these projections assure that user $\pi(i)$ does not disturb previously allocated data streams. The user to which the next data stream is assigned, i.e. the second spatial sub-channel 57 selected by the selector 120, is then the user with the maximum principal singular value of the projected channel matrices $H_k P_i$ in the sub-space spanned by $P_i$, i.e. a processed spatial sub-channel from a processed MIMO radio channel, $$\{\pi(i), u_{\pi(i)}, v_{\pi(i)}\} = \arg\max_{k,u,v} u^H H_k P_i v,$$

$$\text{s.t.} \quad u^H u = 1, v^H v = 1.$$

In contrast to SESAM however, DPC is not applied in the embodiment. Hence the linear pre-coders may completely eliminate multi-user interference, at least multi-user interference is decreased on the basis of the pre-coding information generated by the pre-coding information generator 140. Given a set of users $\{\pi(1), \ldots, \pi(i)\}$, the pre-coders or the pre-coding information can be determined in the following way. As it may be tested in each step of the algorithm, whether the sum rate decreases by adding a further user, this determination can be carried out in each step of the successive allocation.

Subsuming the effective MISO channels $u_{\pi(1)}{}^H H_{\pi(1)}, \ldots,$ $u_{\pi(i)}{}^H H_{\pi(i)}$ into one effective channel matrix $$H_{i,\text{eff}} = \begin{bmatrix} u_{\pi(1)}^H H_{\pi(1)} \\ \vdots \\ u_{\pi(i)}^H H_{\pi(i)} \end{bmatrix}$$

the effective pre-coder $T_{i,\text{eff}}$, i.e. pre-coding information generated by the pre-coding information generator 140, for zero forcing can be given by $$T_{i,\text{eff}} = H_{i,\text{eff}}^\perp \Lambda_i.$$

$H_{i,eff}^\perp$ is the pseudo-inverse of the effective channel matrix $H_{i,eff}$, i.e. $H_{i,eff}H_{i,eff}^\perp = I$ and $\Lambda_i$ is a diagonal scaling matrix, such that each column of $T_{i,eff}$ has norm one. The j-th diagonal element of $\Lambda_i$ is therefore the inverse of the norm of the j-th column of $H_{i,eff}^\perp$. Note, that a Frobenius norm of a MIMO radio channel matrix representing a MIMIO radio channel or a reciprocal of a Frobenius norm of the pseudo inverse of an effective MIMO radio channel matrix may be utilized as transmission capacity measure. The columns of the pre-coders $T_k$ can then be given by the columns of $T_{i,eff}$ which correspond to a data stream allocated to that user k. After building the product $$H_{i,eff}T_{i,eff} = \Lambda_i$$

it becomes obvious that the MIMO system is decomposed into i interference free scalar sub-channels, where $\Lambda_i$ contains the corresponding channel gains. Assuming additive white Gaussian noise with unit variance the sum rate, evaluated e.g. by the sum rate evaluator, at step i can therefore be computed as $$R_{sum,i} = \sum_{j=1}^{i} \log_2(1 + \gamma_{\pi(j),i}\lambda_{\pi(j),i}^2),$$

where $\lambda_{\pi(j),i}$ denotes the j-th diagonal of $\Lambda_i$. The powers $\gamma_{\pi(j),i}$ are determined according to the water-filling principle, cf.

M. T. Cover and J. A. Thomas, *Elements of Information Theory*, John Wiley & Sons, 1991, with the power constraint $$\sum_{j=1}^{i} \gamma_{\pi(j),i} \le P_{Tx}.$$

As with each step the number of zero-forcing constraints increases, all channel gains diminish from one step to the next, i.e. $\lambda_{\pi(j),i} = \lambda_{\pi(j),i-1} - \Delta\lambda_{\pi(j),i}$ with $\Delta\lambda_{\pi(j),i} > 0$.

For this reason in some embodiments it is checked in each step, whether the addition of another user still leads to an increase in sum rate. If not, the method of the embodiment may terminate and the user added in the last step may be removed again, i.e. de-selected from transmission by the selector 120. The method terminates anyway, when $i=M_{Tx}$, as for $i>M_{Tx}$ the pseudo-inverse $H_{i,eff}^\perp$ does not exist anymore. Due to the successive nature and the linear zero-forcing the method in this embodiment can be named "Linear Successive Allocation—LISA" in the following.

In case more than one data stream is assigned to one user, i.e. multiple spatial sub-channels are utilized for the same user, the performance of the algorithm in the embodiment can be slightly improved. The interference between those data streams may not be completely suppressed at the transmitter, as the receiver can support the transmitter in canceling the intra-user interference. Considering for example the case that the second and the third data stream are assigned to the same user k, i.e. $\pi(2)=\pi(3)=k$. The problem of maximizing that user's rate under the zero-forcing constraints can be written as:

$$T'_k = \arg\max \log \left| I + G'^H_k \begin{bmatrix} u^H_{\pi(2)} \\ u^H_{\pi(3)} \end{bmatrix} H_k T'_k \Gamma_k T'^H_k H^H_k [u_{\pi(2)} \; u_{\pi(3)}] G'_k \right| \quad (1.5)$$

s.t. $T'_k \in \text{null}\{u^H_{\pi(1)}H_{\pi(1)}, \ldots, u^H_{\pi(4)}H_{\pi(4)}, \ldots, u^H_{\pi(i)}H_{\pi(i)}\}.$ The original receive filters $u_{\pi(2)}$ and $u_{\pi(3)}$ are included in (1.5) to assure orthogonality to the other users' data streams. The optimum transmit filters are then given by the right singular vectors belonging to the strongest singular values of the matrix $$H_{k,aux} = \begin{bmatrix} u^H_{\pi(2)} \\ u^H_{\pi(3)} \end{bmatrix} H_k P,$$

where P denotes a projection matrix projecting in the null space defined in (1.5). Correspondingly the receiver is given by the product of the two left singular vectors of $H_{k,aux}$ and the originally applied receive filters. The whole method is summarized in the following embodiment of a method for user selection:

---

Initialization $T_k = [\,]$, $G_k = [\,]$, $\Gamma_k = [\,]$, $\forall\, k$, $H_{0,eff} = [\,]$, $P_1 = I$, $i = 1$, $R_{sum,0} = 0$ while $i \le M_{Tx}$ do $\{\pi(i), u_{\pi(i)}, v_{\pi(i)}\} = \underset{k,u,v}{\arg\max}\; u^H H_k P_i v,$ s.t. $u^H u = 1$, $v^H v = 1$ $H_{i,eff} = \begin{bmatrix} H_{i-1,eff} \\ u^H_{\pi(i)} H_{\pi(i)} \end{bmatrix}$ for $j = 1$ to $j = i$ do $\lambda_{\pi(j),i} = \left| [H^+_{i,eff}]_{(:,j)} \right|_2^{-1}$ end for $\{\gamma_{\pi(1),i}, \ldots, \gamma_{\pi(i),i}\} \leftarrow$ waterfilling $(P_{Tx}, \lambda_{\pi(1),i}, \ldots, \lambda_{\pi(i),i})$ $R_{sum,i} = \sum_{j=1}^{i} \log_2(1 + \gamma_{\pi(j),i}\lambda_{\pi(j),i}^2)$ if $R_{sum,i} > R_{sum,i-1}$ then $G_{\pi(i)} = [G_{\pi(i)} u_{\pi(i)}]$ $i = i + 1$ $P_i = P_{i-1} - v_{\pi(i-1)} v^H_{\pi(i-1)}$ else $i = i - 1$, break end if end while $T_{i,eff} = [t_{\pi(1)} \ldots t_{\pi(i)}] = H^+_{i,eff}\Lambda_i$ for $j = 1$ to $j = i$ do $T_{\pi(j)} = [T_{\pi(j)} t_{\pi(j)}]$ $\Gamma_{\pi(j)} = \begin{bmatrix} \Gamma_{\pi(j)} & \\ & \gamma_{\pi(j),i} \end{bmatrix}$ end for

---

Embodiments can be easily extended to Orthogonal Frequency Division Multiplexing (OFDM) systems. The user allocation can be run on parallel on each carrier, for the termination test uniform power allocation over all carriers can be assumed for simplicity reasons. The final power allocation is then conducted by water-filling over all resulting scalar sub-channels.

Firstly, in embodiments the complexity of the user selection process can be reduced by the user pre-selection methods, cf. post published European Patent Application 07004388.0-1249, to be published after filing of the present application. This can avoid the computations of Singular Value Decompositions (SVDs) necessary in (1.4) for all users in each step by excluding some users by simpler criteria, which may not exhibit the maximum principal singular value. Although the pseudo-inverse $H_{i,eff}^{\perp}$ has to be computed only for one user in each step and not for all users as in G. Dimić and N. D. Sidoropoulos, On Downlink Beamforming with Greedy User Selection, *IEEE Transactions on Signal Processing*, 53(10):3857-3868, October 2005, and J. Wang, D. L. Love, and M. Zoltowski, User Selection for MIMO Broadcast Channel with Sequential Water-Filling, In *Proc. of 44th Annual Allerton Conf. on Communications, Control, and Computing*, 2006, computation of matrix inverses still constitutes a huge computational burden.

However, embodiments may exploit the fact that applying the pre-coders for SESAM, which can be computed for the projections in (1.3) anyway, leads to a lower triangular matrix. That is because with SESAM only interference for data streams allocated in a later step is suppressed by linear pre-coders, which leads to a lower triangular matrix $L_i$, when the effective channel matrix is multiplied by the effective pre-coding matrix $V_{i,eff}=[v_{\pi(1)} \ldots v_{\pi(i)}]$, i.e.

$$L_i = H_{i,eff} V_{i,eff}$$

$H_{i,eff}^{\perp}$ can be decomposed according to $$H_{i,eff}^{\perp} = V_{i,eff} L_i^{-1} = [v_{\pi(1)} \ldots v_{\pi(i)}] L_i^{-1}$$

Note that as $V_{i,eff}$ is orthonormal, $\Lambda_i$ can be solely computed from $L_i^{-1}$. Furthermore, as proposed by J. Wang, D. L. Love, and M. Zoltowski, $L_i^{-1}$ can be computed recursively from the matrix $L_{i-1}^{-1}$ required in the previous step as follows:

$$L_i^{-1} = \begin{bmatrix} L_{i-1}^{-1} & 0 \\ -l_i^T L_{i-1}^{-1} l_{i,i}^{-1} & l_{i,i}^{-1} \end{bmatrix}$$

Therein $l_i^T$ contains the first i−1 elements of the i-th row of the matrix $L_i$ and $l_{i,i}$ is the i-th element of the diagonal of $L_i$, i.e.

$$L_i = \begin{bmatrix} l_{1,1} & & & \\ l_{2,1} & l_{2,2} & & \\ & & \ddots & \\ l_i^T & & & l_{i,i} \end{bmatrix}.$$

Taking into account these simplifications and assuming that the maximum number of $M_{Tx}$ data streams can be served with the embodiment performing the method described above the total computational complexity for determination of pre-coding vectors and termination test counted by the number of required floating point operations is of order $O(2M_{Tx}^3)$, where one floating point operation corresponds to one complex addition or multiplication.

In order to evaluate the performance of embodiments it is referred to channels obtained from the measurement campaign described in G. Bauch, J. Bach Andersen, C. Guthy, M. Herdin, J. Nielsen, P. Tejera, W. Utschick, and J. A. Nossek, Multiuser MIMO Channel Measurements and Performance in a Large Office Environment, In *Proc. of IEEE Wireless Communications and Networking Conference (WCNC)*, 2007 (and references therein). Therein an indoor scenario in a large office environment is considered. The access point is a Uniform Linear Array (ULA) with $M_{Tx}=4$ transmit antennas.

As in G. Bauch, et. al, there are K=10 active users, each equipped with $M_{Rx,k}=2$ antennas. The bandwidth is equal to 100 MHz and OFDM with 1024 sub-carriers is employed. FIG. 7 shows a view graph illustrating sum data rates versus signal-to-noise-ratio (SNR). FIG. 7 exhibits the sum rates obtainable in a system as described above. For comparison the performance of Orthogonal Frequency Division Multiple Access (OFDMA), where one carrier is occupied by the user that achieves the maximum sum rate on that carrier is also presented, indicated by a dashed line with triangular markers pointing to the right. The maximum rates achievable with Block Diagonalization, when an exhaustive search is performed for the optimum user selection, are labeled as "BD bound" and are indicated by a dashed line with star markers. "SUS" refers to the semi-orthogonal user selection from T. Yoo and A. Goldsmith, On the Optimality of Multiantenna Broadcast Scheduling Using Zero-Forcing Beamforming, *IEEE Journal on Selected Areas in Communications*, 24(3): 528-541, March 2006, and is indicated by a dashed line with diamond markers.

For the simulations an exclusion factor of $\alpha=0.3$ has been used. The method from J. Wang, D. L. Love, and M. Zoltowski, User Selection for MIMO Broadcast Channel with Sequential Water-Filling, In *Proc. of 44th Annual Allerton Conf. on Communications, Control, and Computing*, 2006, which is called "Sequential waterfilling" is labeled as "Seq. WF", and indicated by a dashed line with circular markers. The maximum achievable sum rate is denoted as "Sato bound", whereas it can only be achieved when perfect DPC is applied, indicated by a dashed line with cross markers. Furthermore in FIG. 7 sum rates obtainable with a practical implementation for DPC, namely Tomlinson-Harashima Precoding (THP), are exhibited indicated by a dashed line with triangular markers pointing to the bottom. For simplicity reasons SESAM instead of the optimum iterative waterfilling for the THP curve has been used, which introduces only negligible errors.

The difference between this curve and the optimum is due to the shaping loss of THP U. Erez, S. Shamai, and R. Zamir, Capacity and Lattice Strategies for Canceling Known Interference, *IEEE Transactions on Information Theory*, 51:3820-3833, November 2005. The embodiment, labeled LISA and indicated by a solid line with asterisks markers, shows a similar performance as sequential waterfilling and clearly outperforms the other linear approaches. Furthermore the difference to the maximum sum capacity is small and better sum rates can be achieved than with THP.

Although sequential waterfilling and LISA, i.e. the embodiment, almost lead to the same sum rates, LISA is less complex. FIG. 8 shows the estimated computational complexity measured in number of floating point operations of sequential waterfilling, LISA and OFDMA. For each algorithm plotted the maximum complexity is plotted in a bar graph for a system with the given parameters, where no computational savings that depend on the used channel realizations are considered. For LISA that implies that the SVDs in (1.3) are computed for every user and no pre-selection is used, e.g. cf. post published European Patent Application 07004388.0-1249, to be published after filing of the present application. For Sequential waterfilling the theorem 1 from J. Wang, D. L. Love, and M. Zoltowski, User Selection for MIMO Broadcast Channel with Sequential Water-Filling, In *Proc. of* 44*th Annual Allerton Conf. on Communications, Control, and Computing,* 2006 is not applied.

In FIG. 8 furthermore the contributions of the different parts of the algorithms to the total complexity are visualized. "SVD" and "Projections" refer to the complexity of the SVDs and projections required in (1.3). Under "User selection" and "Waterfilling" the complexity of user selection and of the power allocation is subsumed, respectively. By pre-selection it is referred to the complexity of the preselection method of post published European Patent Application 07004388.0-1249, to be published after filing of the present application.

"Pre-coding and testing" contains the operations necessary to compute the transmit filters and to test, whether sum capacity decreases from one step to the next. The most complex part for sequential waterfilling is therefore the user selection, as the increase in sum rate has to be computed for every resulting MISO channel in each step to determine the user that leads to the maximum increase in sum rate. Furthermore LISA is with respect to the maximum complexity as well as for the channel dependent complexity much less complex than sequential waterfilling. For the analyzed measurement scenario LISA is about 60% less complex than sequential waterfilling.

Conventional concepts achieving the maximum sum capacity of the Multiple-Input Multiple-Output (MIMO) broadcast channel require nonlinear Dirty Paper Coding (DPC) at the transmitter. Practical DPC implementations which perform nearly optimally are computationally expensive. Therefore, embodiments may provide linear approaches where the inter-user interference is minimized or completely suppressed by linear pre-coding techniques. Embodiments may therewith establish an efficient alternative to DPC. By considering linear zero-forcing constraints, the allocation of data streams to users becomes a combinatorial optimization problem and most of the state-of-the-art approaches require an exhaustive search to find the optimum solution.

Embodiments can successively allocate data streams to users or spatial sub-channels, respectively, and determine the corresponding receive filters by assuming DPC at the transmitter. However, after allocation, a linear zero-forcing beamformer can be applied at the transmitter in embodiments. Compared to the best state-of-the-art zero-forcing algorithms, performance of embodiments can remain at the same level whereas complexity can be drastically reduced.

Depending on certain implementation requirements of the inventive methods, the inventive methods can be implemented in hardware or in software. The implementation can be performed using a digital storage media, in particular a disc, a DVD, a flash memory or a CD having electronically readable control signals stored thereon, which cooperate with a programmable computer system such that the inventive methods are performed. Generally, the present invention is therefore a machine readable carrier with a program code being operative for performing the inventive methods when the computer program product runs on a computer or processor. In other words, the inventive methods are, therefore, a computer program having a program code for performing at least one of the inventive methods when the computer program runs on a computer or processor.

The invention claimed is:

1. A spatial sub-channel selection and pre-coding apparatus for being operative in a first communication device, the first communication device being adapted for communicating with a second communication device and a third communication device using MIMO (MIMO=Multiple-Input-Multiple-Output) radio channels, a first MIMO radio channel extending between the first communication device and the second communication device having at least one spatial sub-channel, a second MIMO radio channel extending between the first communication device and the third communication device having at least one spatial sub-channel, wherein one of the first MIMO radio channel or the second MIMO radio channel has at least two spatial sub-channels, comprising:
a MIMO radio channel decomposer for decomposing the first MIMO radio channel and/or the second MIMO radio channel into a plurality of spatial sub-channels and for providing a transmission capacity measure for each of the spatial sub-channels;
a selector for selecting a first spatial sub-channel for transmission based on the transmission capacity measures from the plurality of spatial sub-channels, where other spatial sub-channels not selected by the selector are non-selected spatial sub-channels;
a MIMO radio channel processor for processing the first or the second MIMO radio channel based on the first spatial sub-channel to obtain a processed MIMO radio channel having at least one non-selected processed spatial sub-channel in a way such that a possible interference on the first spatial sub-channel caused by the at least one non-selected processed spatial sub-channel is reduced or eliminated;
wherein the selector is adapted for selecting a non-selected processed spatial sub-channel of the processed MIMO radio channel as second spatial sub-channel for transmission;
a sum capacity evaluator for evaluating a first sum capacity measure on the MIMO radio channel based on the first spatial sub-channel, and for evaluating a second sum capacity measure on the MIMO radio channel based on the first and the second spatial sub-channels, wherein the selector is adapted for de-selecting the second spatial sub-channel from transmission, when the second sum capacity measure indicates a lower sum capacity on the MIMO radio channel than the first sum capacity measure; and
a pre-coding information generator for generating a pre-coding information for the first spatial sub-channel in such a way that an interference on the second spatial sub-channel caused by the first spatial sub-channel is decreased or eliminated.

2. The spatial sub-channel selection and pre-coding apparatus of claim 1, wherein the MIMO radio channel decomposer is adapted for providing a transmission capacity measure for each of the non-selected processed spatial sub-channels.

3. The spatial sub-channel selection and pre-coding apparatus of claim 2, wherein the first MIMO radio channel and the second MIMO radio channel comprise a plurality of spatial sub-channels and the selector is adapted for selecting the second spatial sub-channel based on the transmission capacity measures of the processed spatial sub-channels.

4. The spatial sub-channel selection and pre-coding apparatus of one of the claims 1 to 3, wherein the selector is adapted for selecting as the first or second spatial sub-channel for transmission a spatial sub-channel for which the transmission capacity measure is higher than the lowest transmission capacity measure of the spatial sub-channels or processed spatial sub-channels of the plurality of spatial sub-channels.

5. The spatial sub-channel selection and pre-coding apparatus of claim 4, wherein the selector is adapted for selecting as first or second spatial sub-channel a sub-channel for transmission for which the transmission capacity measure is the highest transmission capacity measure from the plurality of spatial sub-channels or processed spatial sub-channels.

6. The spatial sub-channel selection and pre-coding apparatus of one of the claims 1 to 5, wherein the selector is adapted for selecting one spatial sub-channel per user.

7. The spatial sub-channel selection and pre-coding apparatus of claim 1, wherein the MIMO radio channel decomposer is adapted for decomposing the MIMO radio channel by utilizing a singular value decomposition or an Eigen value analysis on a MIMO radio channel matrix representing the MIMO radio channel.

8. The spatial sub-channel selection and pre-coding apparatus of claim 7, wherein the MIMO radio channel decomposer is adapted for providing a singular value or an Eigen value as the transmission capacity measure.

9. The spatial sub-channel selection and pre-coding apparatus of claim 8, wherein the selector is adapted for selecting the first spatial sub-channel based on a maximum singular value or Eigen value of the plurality of spatial sub-channels.

10. The spatial sub-channel selection and pre-coding apparatus of claim 7, wherein the MIMO radio channel processor is adapted for obtaining the processed second MIMO radio channel by projecting the MIMO radio channels of non-selected users into a sub-space based on the MIMO radio channel of the first spatial sub-channel.

11. The spatial sub-channel selection and pre-coding apparatus of claim 10, wherein the sub-space is a null space.

12. The spatial sub-channel selection and pre-coding apparatus of claim 1, wherein the pre-coding information generator is adapted for generating a linear pre-coding information in terms of a linear pre-coding operation.

13. The spatial sub-channel selection and pre-coding apparatus of claim 12, wherein the pre-coding information generator is adapted for generating coefficients for a beam forming filter.

14. The spatial sub-channel selection and pre-coding apparatus of claim 13, wherein the pre-coding information generator is adapted for generating coefficients for a zero forcing beam forming filter with respect to the second spatial sub-channel.

15. The spatial sub-channel selection and pre-coding apparatus of claim 1, wherein the sum capacity evaluator is adapted for evaluating the second sum capacity measure based on a pre-coded first spatial sub-channel and the second spatial sub-channel.

16. A method for selecting and pre-coding spatial sub-channels for being operative in a first communication device for communicating with a second communication device and a third communication device using MIMO (MIMO=Multiple-Input-Multiple-Output) radio channels, a first MIMO radio channel extending between the first communication device and the second communication device having at least one spatial sub-channel, a second MIMO radio channel extending between the first communication device and the third communication device having at least one spatial sub-channel, wherein one of the first MIMO radio channel or the second MIMO radio channel has at least two spatial sub-channels, comprising the steps of decomposing the first MIMO radio channel into the plurality of spatial sub-channels;

providing a transmission capacity measure for each of the spatial sub-channels;

selecting a first spatial sub-channel for transmission based on the transmission capacity measures from the plurality of spatial sub-channels, where other spatial sub-channels not selected are non-selected spatial sub-channels;

processing the second MIMO radio channel based on the first spatial sub-channel to obtain a processed second MIMO radio channel having a least one non-selected processed spatial sub-channel in a way such that a possible interference on the first spatial sub-channel caused by the at least one non-selected processed spatial sub-channel is reduced or eliminated;

selecting a non-selected processed second spatial sub-channel of the processed MIMO radio channel as second spatial sub-channel for transmission;

evaluating a first sum capacity measure on the MIMO radio channel based on the first spatial sub-channel, and evaluating a second sum capacity measure on the MIMO radio channel based on the first and the second spatial sub-channels, wherein the second spatial sub-channel is deselected from transmission, when the second sum capacity measure indicates a lower sum capacity on the MIMO radio channel than the first sum capacity measure; and generating a pre-coding information for the first spatial sub-channel in such a way that an interference on the second spatial sub-channel caused by the first spatial sub-channel is decreased or eliminated.

17. A non-transitory computer-readable medium having a computer program stored thereon having a program code for performing the method of claim 16, when the program code runs on a processor.

18. A spatial sub-channel selection and pre-coding apparatus for being operative in a first communication device, the first communication device being adapted for communicating with a second communication device and a third communication device using MIMO (MIMO=Multiple-Input-Multiple-Output) radio channels, a first MIMO radio channel extending between the first communication device and the second communication device having at least one spatial sub-channel, a second MIMO radio channel extending between the first communication device and the third communication device having at least one spatial sub-channel, wherein one of the first MIMO radio channel or the second MIMO radio channel has at least two spatial sub-channels, comprising:

a MIMO radio channel decomposer for decomposing the first MIMO radio channel and/or the second MIMO radio channel into a plurality of spatial sub-channels and for providing a transmission capacity measure for each of the spatial sub-channels;

a selector for selecting a first spatial sub-channel for transmission based on the transmission capacity measures from the plurality of spatial sub-channels, where other spatial sub-channels not selected by the selector are non-selected spatial sub-channels;

a MIMO radio channel processor for processing the first or the second MIMO radio channel based on the first spatial sub-channel to obtain a processed MIMO radio channel having at least one non-selected processed spatial sub-channel in a way such that a possible interference on the first spatial sub-channel caused by the at least one non-selected processed spatial sub-channel is reduced or eliminated;

wherein the selector is adapted for selecting a non-selected processed spatial sub-channel of the processed MIMO radio channel as second spatial sub-channel for transmission; and a pre-coding information generator for generating a pre-coding information for the first spatial sub-channel in such a way that an interference on the second spatial sub-channel caused by the first spatial sub-channel is decreased or eliminated;

wherein the MIMO radio channel decomposer is adapted for decomposing the MIMO radio channel by utilizing a singular value decomposition or an Eigen value analysis on a MIMO radio channel matrix representing the MIMO radio channel;

wherein the MIMO radio channel decomposer is adapted for providing a singular value or an Eigen value as the transmission capacity measure; and wherein the selector is adapted for selecting the first spatial sub-channel based on a maximum singular value or Eigen value of the plurality of spatial sub-channels.

19. The spatial sub-channel selection and pre-coding apparatus of claim 18, wherein the MIMO radio channel processor is adapted for obtaining the processed second MIMO radio channel by projecting the MIMO radio channels of non-selected users into a sub-space based on the MIMO radio channel of the first spatial sub-channel.

20. The spatial sub-channel selection and pre-coding apparatus of claim 19, wherein the sub-space is a null space.

21. A method for selecting and pre-coding spatial sub-channels for being operative in a first communication device for communicating with a second communication device and a third communication device using MIMO (MIMO=Multiple-Input-Multiple-Output) radio channels, a first MIMO radio channel extending between the first communication device and the second communication device having at least one spatial sub-channel, a second MIMO radio channel extending between the first communication device and the third communication device having at least one spatial sub-channel, wherein one of the first MIMO radio channel or the second MIMO radio channel has at least two spatial sub-channels, comprising the steps of decomposing the first MIMO radio channel into the plurality of spatial sub-channels;

providing a transmission capacity measure for each of the spatial sub-channels;

selecting a first spatial sub-channel for transmission based on the transmission capacity measures from the plurality of spatial sub-channels, where other spatial sub-channels not selected are non-selected spatial sub-channels;

processing the second MIMO radio channel based on the first spatial sub-channel to obtain a processed second MIMO radio channel having a least one non-selected processed spatial sub-channel in a way such that a possible interference on the first spatial sub-channel caused by the at least one non-selected processed spatial sub-channel is reduced or eliminated;

selecting a non-selected processed second spatial sub-channel of the processed MIMO radio channel as second spatial sub-channel for transmission; and generating a pre-coding information for the first spatial sub-channel in such a way that an interference on the second spatial sub-channel caused by the first spatial sub-channel is decreased or eliminated;

wherein, for decomposing the first MIMO radio channel, a singular value decomposition or an Eigen value analysis on a MIMO radio channel matrix representing the first MIMO radio channel is utilized;

wherein, for decomposing the first MIMO radio channel, a singular value or an Eigen value is provided as the transmission capacity measure; and wherein the selecting of the first spatial sub-channel is based on a maximum singular value or Eigen value of the plurality of spatial sub-channels.

22. A non-transitory computer-readable medium having a computer program stored thereon having a program code for performing the method of claim 21, when the program code runs on a processor.

* * * * *